US006445736B1

(12) United States Patent
Wheeler

(10) Patent No.: US 6,445,736 B1
(45) Date of Patent: Sep. 3, 2002

(54) GSM BASEBAND RECEIVER ARRANGEMENT USING DIGITAL SIGNAL PROCESSING

(75) Inventor: David Andrew Wheeler, Berkshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/134,698

(22) Filed: Aug. 14, 1998

(30) Foreign Application Priority Data

Aug. 16, 1997 (GB) ............................................. 9717374

(51) Int. Cl.[7] ............................ H03H 7/30; H03K 5/159
(52) U.S. Cl. ........................ 375/235; 375/247; 375/350
(58) Field of Search ................................. 375/322, 329, 375/334, 248, 229, 232, 233, 234, 235, 350; 341/143

(56) References Cited

U.S. PATENT DOCUMENTS 5,408,235 A * 4/1995 Doyle et al. ................ 341/143

5,903,232 A * 5/1999 Zarubinsky et al. ........... 341/61
6,075,820 A * 6/2000 Comino et al. ............. 375/245

FOREIGN PATENT DOCUMENTS

GB  2215945 A  9/1989

\* cited by examiner

*Primary Examiner*—Don N. Vo
(74) *Attorney, Agent, or Firm*—Scully, Scott, Murphy & Presser

(57) ABSTRACT

GSM baseband receiver arrangement using digital signal processing is disclosed. The baseband receiver arrangement comprises two channel for inphase ($I_{in}$) and quadrature ($Q_{in}$) components of the received signal. The DC offset of each channel is separately estimated by accumulating samples from the outputs of the second filter stages M1 and M2 and dividing the result by 64. The result is then negated and applied to the digital DC offset controls I1 and I2. This two stage process ensures that the majority DC offset is removed prior to variable gain, and the residual DC offset is removed before digital frequency shifting. Applying DC offset correction before the digital frequency shifting ensures that DC is annulled for any subsequent shift.

8 Claims, 2 Drawing Sheets

GSM BASEBAND RECEIVER ARRANGEMENT USING DIGITAL SIGNAL PROCESSING

BACKGROUND OF THE INVENTION

1. Field of the Invention

This invention relates to a GSM(Group Special Mobile) mobile receiver and has particular reference to the GSM baseband receive architecture of the receiver.

2. Description of the Related Art

In a conventional GSM baseband receiver, analog circuit is used for achieving the various baseband functions. GSM baseband receiver using the analog circuit needs an expensive voltage controlled oscillator, which makes the GSM baseband receiver very costly.

SUMMARY OF THE INVENTION

It is an object of the present invention to provide a baseband receiver arrangement for a GSM mobile phone, in which the various baseband functions can be achieved efficiently utilizing as much digital signal processing as possible.

Broadly, the invention resides in a baseband receiver arrangement for a GSM phone comprising in each of two channels for inphase and quadrature components of the received signals, a Sigma-Delta modulator for providing a high frequency single-bit data stream, a first digital filter for converting such data stream to a multi-bit signal at a multiple of the symbol rate, and a second digital filter for converting such multi-bit signal to a multi-bit output signal at the symbol rate.

Preferably, frequency correction is obtained using a complex digital frequency shifter arranged between the first and second digital filters.

Preferably DC offset cancellation is obtained by means of a coarse analog DC offset cancellation section in each channel and a digital DC offset cancellation section operating on the output of the first digital filter of each channel to provide two-stage DC offset cancellation.

Preferably, a digitally controlled analog gain control section is provided in each channel controlled by an RMS signal level calculator deriving its inputs from the output of the first digital filters.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1A:
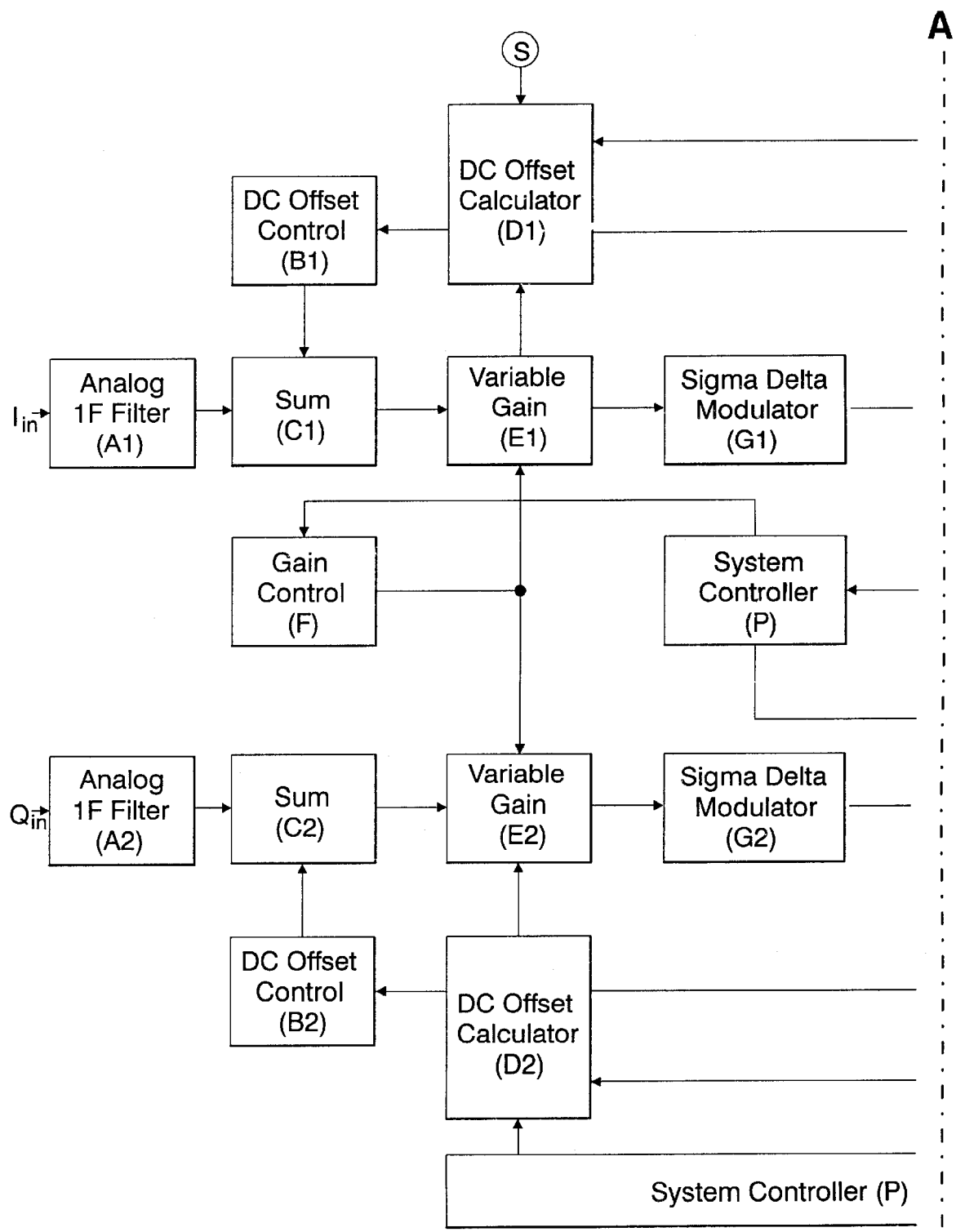
FIG. 1 is a block diagram showing a construction of a GSM baseband receiver arrangement of a first embodiment of the present invention.
Figure 1B:
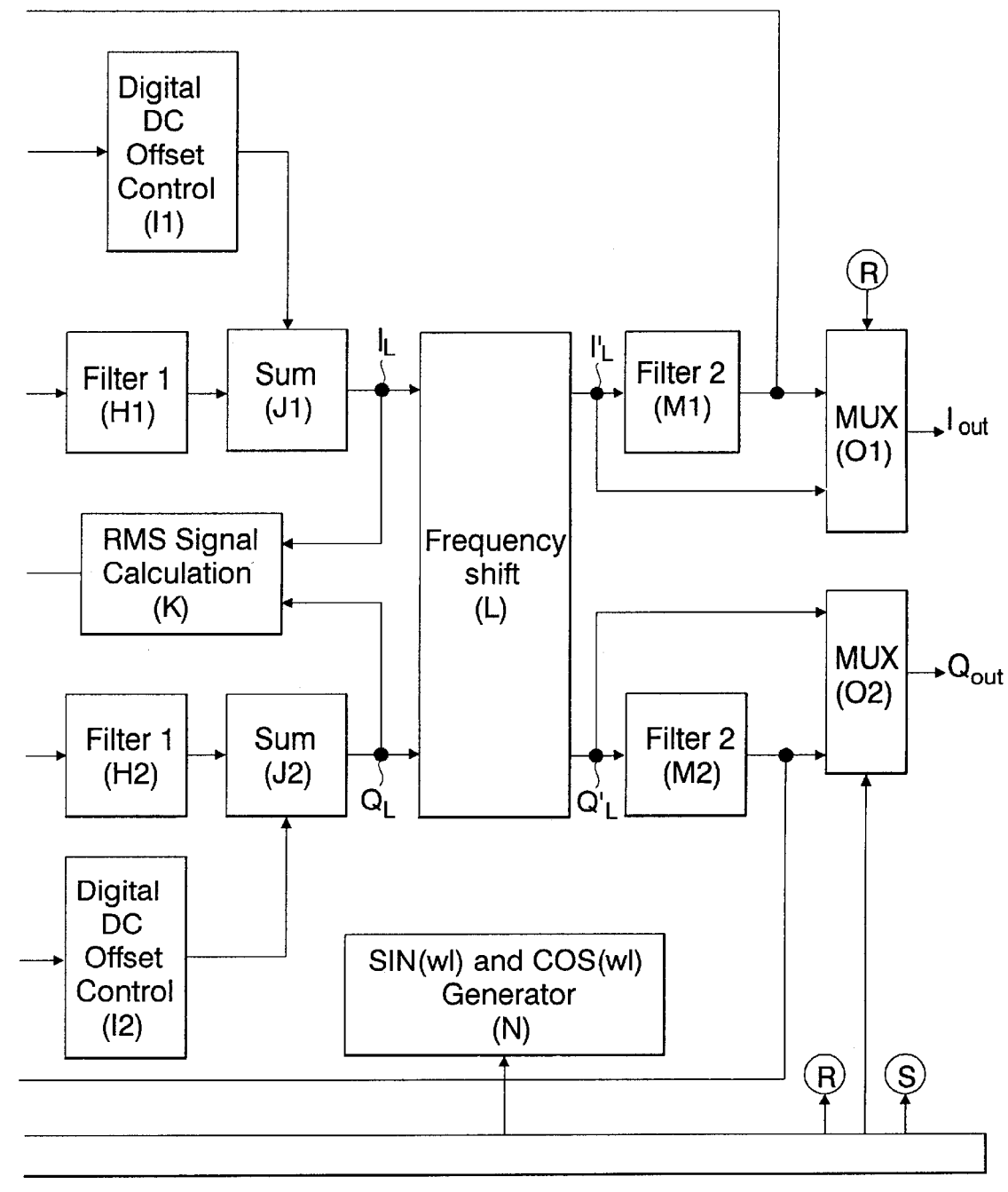

An example of the invention is shown in the accompanying drawing of which the single figure is a block diagram of a GSM baseband receiver arrangement.

The baseband receiver arrangement shown comprises two channel for inphase ($I_{in}$) and quadrature ($Q_{in}$) components of the received signal from an RF stage (not shown). From input to output, each channel comprises an analog IF filter section (A1, A2), an analog summing section (C1, C2) used for coarse DC offset cancellation, a variable gain section (E1, E2), a Sigma Delta modulator (G1, G2), a first digital filter state (H1, H2) and a. digital summing section (J1, J2) used for fine DC offset cancellation, a frequency shifter (L), which is common to both channels, a second digital filter stage (M1, M2) and a multiplexer (O1, O2) which can selective pass to the outputs the output of the second filter stage or that of the frequency shifter L.

The analog IF filter sections A1 and A2 are third order Butterworth continuous time filters with a worst case half power point at 105 kHz. Group delay ripple of these filters should be of the order of ±0.5 $\mu$S, where the symbol period is 3.69 $\mu$S (for GSM). The IF filter sections remove some of the energy in GSM channels adjacent the frequency channel to be received.

The analog variable gain sections E1, E2 are designed to amplify the signals passed by the filters A1, A2 by up to 16 dB. The gain is digitally controlled in four 4 dB steps so as to ensure that the dynamic range of the ADCs formed by the Sigma-Delta modulators G1, G2 and the two digital filter sections is efficiently used.

As mentioned above the Sigma-Delta modulators and the two digital filter sections form a two channel ADC. The modulators G1 and G2 operate at a sample rate of 13 MHz i.e. 48 times the symbol rate. A single bit digital output stream is produced. The first digital filter sections H1 and H2 are implemented as $\{sin(x)/x\}^3$ filters which reduce the sample rate by a factor of 16 to give a rate 3 times the symbol rate and provide a 13 bit output. The half power points of filters H1 and H2 occur at approximately 210 kHz. The second digital filter sections are implemented as FIR (Finite Impulse Response) filters with 36 taps. Each has real coefficients and linear phase which means that it can be implemented using 18 multiply accumulates. Each filter has a half power point at 95 kHz and stopband rejection of 55 dB from 135 kHz to 406.25 kHz. The filter ripple passband is less than ±0.1 dB.

The frequency shifter L is provided to enable the mobile station and the basestation frequency references to be synchronised. In practice frequency shifts of up to 20 kHz may be required and since the samples on which the shifter L operates are at a rate three times the symbol rate large but accurate shifts are possible.

The frequency shifter operates in accordance with the following:

$$I'L = IL*C(i+f) - QL*S(i+f)$$

$$Q'L = IL*S(i+f) + QL*C(i+f)$$

where i is an integer index into a cosine table and f is a fractional interpolation value. The notation C(i+f) and S(i+f) indicate approximate cosine and sine values from a quantised table with linear interpolation. This requires 4 multiply accumulates at the 3× symbol rate equal to 12 multiply accumulates at the symbol rate. Interpolation is effected as follows assuming for simplicity that a full cycle table of N entries is available:

$$C(i+f) = C(i) + f*\{C(i+1) - C(i)\}$$

$$S(i+f) = S(i) + f*\{S(i+1) - S(i)\}$$

$$C(i) = \cos(2\pi i/N)$$

$$S(i) = \sin(2\pi i/N)$$

DC offset cancellation is carried out in two stages using the analog summing sections C1 and C2 at the inputs to the variable gain sections E1 and E2 and the digital summing sections J1 and J2 at the inputs of the frequency shifter L.

The analog summing sections C1 and C2 receive analog offset signals from controls B1 and B2. Similarly the digital summing sections receive digital offset signals from controls I1 and I2. Both analog controls B1 and B2 and digital controls I1 and I2 are in turn controlled by DC offset calculators D1 and D2 which receive digital inputs from the respective second filter states M1 and M2.

When the mobile station is receiving on its paging channel, the DC offset calculation need be performed only once. The result read by the system controller P can be re-applied to each received burst. This can be done because the paging channel does not frequency hop and reception is so infrequent that averaging in the AGC has no effect, so the AGC might as well be held constant. In this situation the DC offset presented by the RF device will not change for burst receive. The DC offset should be re-estimated every time the AGC is changed or the receive frequency changes.

The DC offset is calculated prior to receiving a burst. The frequency offset N is set to zero for this calculation. The variable gain sections E1 and E2 are set to the values which will be used for the burst receive. The RF front end is presented to an equivalent resistance to the antenna. The calibration begins with the ADC converting 64 samples. The DC offset in each channel is estimated by accumulating samples from the second filter stages M1 and M2 and dividing the sum by 64. The result is then divided by the variable gain and negated and applied to the analog DC offset controls B1 and B2. The calibration is then continued with controls B1 and B2 applying the coarse correction just determined and the ADC converts the next 64 samples.

The DC offset of each channel is separately estimated by accumulating samples from the outputs of the second filter stages M1 and M2 and dividing the result by 64. The result is then negated and applied to the digital DC offset controls I1 and I2. This two stage process ensures that the majority DC offset that would affect the ADC dynamic range is removed prior to variable gain, and the residual DC offset is removed before digital frequency shifting. Applying DC offset correction before the digital frequency shifting ensures that DC is annulled for any subsequent shift.

The analog DC offset controls B1 and B2 are implemented as 4 bit DACs to allow the DC correction to be held indefinitely until the next calibration. The digital DC offset controls I1 and I2 are simply read/write registers to hold the calculated values.

Both variable gain sections E1 and E2 are controlled by a common gain control F. RMS signal level is calculated from the outputs of the digital summing sections J1 and J2, i.e. the signals used are DC corrected signals which have been subjected to the first stage of digital filtration. At this stage, the 3rd adjacent channels and beyond have all been attenuated by more than 20 dB, so that the RMS calculation includes only two adjacent channels on either side of the wanted channel. The RMS value is calculated as:

sqrt (average output $(H2)^2$+output$(H1)^2$)) over a whole burst receive or by the approximation (which is easier to calculate):

average (abs (output(H2)+output(H1)))

The accumulation takes place at three times the symbol rate so that 450 samples could be used during a burst receive.

The arrangement described above provides all the required functions for the GSM baseband receiver in a very cost effective design. In particular, it should be noted that frequency correction is achieved without the need for an expensive voltage controlled crystal oscillator.

While a preferred embodiment of the present invention has been described using specific terms, such description is for, illustrative purposes only, and it is to be understood that changes and variations may be made without departing from the spirit or scope of the following claims.

What is claimed is:

1. A baseband receiver arrangement for a GSM phone comprising in each of two channels for inphase and quadrature components of the received signals:

a Sigma-Delta modulator for providing a high frequency single-bit data stream;

a first digital filter for converting said data stream to a multi-bit signal at a multiple of the symbol rate; and a second digital filter for converting said multi-bit signal to a multi-bit output signal at the symbol rate.

2. A baseband receiver arrangement as claimed in claim 1, in which the sigma-delta modulators operate at 13 MHz.

3. A baseband receiver arrangement as claimed in claim 1, in which said first filter stage in each channel comprises a $\{\sin(x)/(x)\}^3$ filter having a half power point at approximate 210 MHz and providing an output at three times the symbol rate.

4. A baseband receive arrangement as claimed in claim 1, in which the second filter stage in each channel is a FIR filter of 36 taps with a halfpower point of 95 kHz.

5. A baseband receiver arrangement for a GSM phone comprising in each of two channels for inphase and quadrature components of the received signals:

a Sigma-Delta mondulator for providing a high frequency single-bit data stream;

a first digital filter for converting said data stream to a multi-bit signal at a multiple of the symbol rate;

a second digital filter for converting said multi-bit signal to a multi-bit output signal at the symbol rate; and the baseband receiver arrangement further comprising a complex digital frequency shifter operating on the signals from the two channels and occurring between the first and second digital filter stages.

6. A baseband receiver arrangement for a GSM phone comprising in each of two channels for inphase and quadrature components of the received signals:

a Sigma-Delta mondulator for providing a high frequency single-bit data stream;

a first digital filter for converting said data stream to a multi-bit signal at a multiple of the symbol rate;

a second digital filter for converting said multi-bit signal to a multi-bit output signal at the symbol rate; and the baseband receiver arrangement further comprising a split DC offset cancellation arrangement comprising a coarse analog DC offset cancellation section in each channel and a digital DC offset cancellation section in each channel operating on the output of the first digital filter stage.

7. A baseband receiver arrangement as claimed in claim 6, in which the two DC offset cancellation sections in each channel are controlled by a DC offset calculator which derives input samples from the output of the second digital filter stage of each channel.

8. A baseband receiver arrangement for a GSM phone comprising in each of two channels for inphase and quadrature components of the received signals:

a Sigma-Delta modulator for providing a high frequency single-bit data stream;

a first digital filter for converting said data stream to a multi-bit signal at a multiple of the symbol rate;

a second digital filter for converting said multi-bit signal to a multi-bit output signal at the symbol rate; and a digitally controlled analog gain control circuit in each channel, controlled by a common RMS signal level calculator deriving its inputs from the output of the first digital filter stages.

* * * * *